US009529157B2

(12) United States Patent
Zhang et al.

(10) Patent No.: US 9,529,157 B2
(45) Date of Patent: Dec. 27, 2016

(54) 3D-MEMS OPTICAL SWITCH (71) Applicant: Huawei Technologies Co., Ltd., Shenzhen (CN)

(72) Inventors: Chunhui Zhang, Shenzhen (CN); Chendi Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/950,877

(22) Filed: Nov. 24, 2015

(65) Prior Publication Data

US 2016/0124157 A1 May 5, 2016

Related U.S. Application Data (63) Continuation of application No. PCT/CN2013/085407, filed on Oct. 17, 2013.

(30) Foreign Application Priority Data

May 28, 2013 (CN) .......................... 2013 1 0201951

(51) Int. Cl.
*G02B 6/35* (2006.01)

(52) U.S. Cl.
CPC ........... *G02B 6/3518* (2013.01); *G02B 6/3556* (2013.01)

(58) Field of Classification Search
CPC ............................ G02B 6/3556; G02B 6/3518
See application file for complete search history.

(56) References Cited

U.S. PATENT DOCUMENTS

| 6,567,574 B1* | 5/2003 | Ma ..................... H04Q 11/0005 385/16 |
| 6,798,992 B1 | 9/2004 | Bishop et al. |
| 6,922,500 B2* | 7/2005 | Huang ............... H04Q 11/0005 385/18 |
| 7,177,496 B1 | 2/2007 | Polynkin et al. |
| 2003/0210454 A1 | 11/2003 | Tochio et al. |
| 2004/0258349 A1 | 12/2004 | Cerato |
| 2005/0213978 A1 | 9/2005 | Yamashita et al. |

(Continued)

FOREIGN PATENT DOCUMENTS

| CN | 1457200 A | 11/2003 |
| CN | 1623082 A | 6/2005 |

(Continued)

*Primary Examiner* — Omar R Rojas
(74) *Attorney, Agent, or Firm* — Leydig, Voit & Mayer, Ltd.

(57) ABSTRACT

A 3D-MEMS optical switch, comprising: a collimator array, a PD array, a window glass which covers the PD array and is coated with a partial reflection film, a micro-electro mechanical system (MEMS) micro-mirror, and a core optical switch controller connected to the PD array and the MEMS micro-mirror. The PD array is integrated inside the core optical switch, so that the architecture and the volume of the optical switch are simplified. The window glass which covers the PD array and is coated with a partial reflection film is used to fold an optical path, and some optical signals are transmitted onto the PD array, so that the core optical switch controller adjusts the MEMS micro-mirror according to the optical power of the optical signals detected by the PD array, so as to enable the insertion loss of the 3D-MEMS optical switch to meet a preset attenuation range.

12 Claims, 3 Drawing Sheets (56) References Cited

U.S. PATENT DOCUMENTS

| | | |
|---|---|---|
| 2012/0069421 A1 | 3/2012 | Fu |
| 2013/0107347 A1 | 5/2013 | Chau |
| 2013/0108266 A1 | 5/2013 | Fu |
| 2013/0243372 A1 | 9/2013 | Chen et al. |
| 2013/0336615 A1 | 12/2013 | Wang et al. |

FOREIGN PATENT DOCUMENTS

| | | | |
|---|---|---|---|
| CN | 101930121 | A | 12/2010 |
| CN | 101995657 | A | 3/2011 |
| CN | 102135645 | A | 7/2011 |
| CN | 102135647 | A | 7/2011 |
| CN | 102262293 | A | 11/2011 |

* cited by examiner

3D-MEMS OPTICAL SWITCH

CROSS-REFERENCE TO RELATED APPLICATIONS

This application is a continuation of International Patent Application No. PCT/CN2013/085407, filed on Oct. 17, 2013, which claims priority to Chinese Patent Application No. 201310201951.0, filed on May 28, 2013, both of which are hereby incorporated by reference in their entireties.

FIELD

The present application relates to the field of communication, and in particular to a 3D-MEMS optical switch.

BACKGROUND

With the continuous development of information technology, a DWDM (Dense Wavelength Division Multiplexing, dense wavelength division multiplexing) technology provides an efficient approach to a point-to-point optical fiber transmission with a large capacity. In an all-optical communication network, the DWDN technology is used on a trunk line to extend capacity, an optical add-drop multiplexer (OADM, Optical Add-Drop Multiplexer) and an optical cross connect (OXC, Optical Cross Connect) are used as a cross node, and fiber to the home (FTTH, Fiber To The Home) is realized by an optical fiber access technology. The OXC and the OADM are core technologies of the all-optical network, and cores of the OXC and the OADM are an optical switch and an optical switch array. A MEMS (Micro-Electro-Mechanic System, micro-electro-mechanic system) optical switch may include a 2D-MEMS (2-Dimensions Micro-Electro-Mechanic System, 2-dimensions micro-electro-mechanic system) optical switch and a 3D-MEMS (3-Dimensions Micro-Electro-Mechanic System, 3-dimensions micro-electro-mechanic system) optical switch. A large-scale switch array can not be realized by the 2D-MEMS optical switch because of unbalance insertion losses of channels. A very large-scale switch array can be realized by the 3D-MEMS optical switch because of a small distance between ports of the 3D-MEMS optical switch. Therefore, the 3D-MEMS optical switch can be used to realize a large-capacity OXC node, which can be applied to a large-capacity optical switching field.

In the 3D-MEMS, a micromirror is rotated to deflect the optical path, therefore switching between optical paths. However, the micromirror can not be rotated to an optimal location steadily and rapidly because of some factors such as inertia and vibration, and therefore the insertion loss of the 3D-MEMS optical switch can not reach an optimal state. In a conventional technology, a power detection module is added at an input port and an output port of an optical fiber. A closed loop feedback mechanism is formed by comparing an input power with an output power and feeding back a comparison result to the micromirror, to control the micromirror, thereby calibrating the micromirror to be in the optimal state and minimizing the insertion loss of the 3D-MEMS optical switch.

Figure 1:
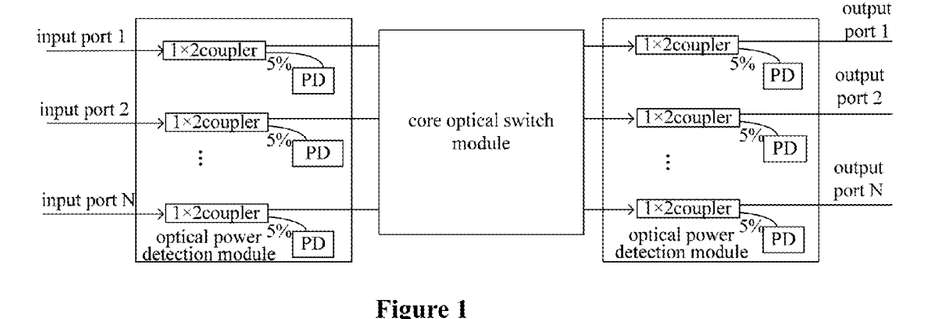
FIG. 1 is a schematic structural diagram of a 3D-MEMS optical switch according to the conventional technology.

In the 3D-MEMS optical switch according to the conventional technology, an optical power detection module of the optical switch is disposed separately from a core optical switch module. As shown in FIG. 1, the optical power detection module of the optical switch is disposed at an input/output port of an optical fiber. An input port of each path is connected with a 1×2 coupler, and two output ports of the coupler can provide light which is split on demand, such as 5%:95%, 2%:98% or 10%:90%. A PD (power detector, power detector) is connected to a port having a smaller coupling ratio, to detect optical power. A port having a larger coupling ratio is connected to the core optical switch module. All couplers and the PDs at the input port are placed in the same optical power detection module, and similarly, an optical power detection module is formed at the output port.

The conventional technology has defects as follows: the power detection modules are added at the input port and the output port of the optical fiber, and the core optical switch module is disposed separately from the optical power detection module, both the core optical switch module and the optical power detection module are connected to a master control board via data lines, and the length of the data line may limit a communication rate between the optical power detection module and the core optical switch module, thereby prolonging a calibration and stabilization time for a micromirror; a large number of couplers and PDs are required when a large-scale 3D-MEMS optical switch is realized, so that the volume of the optical power detection module becomes very large, which does not facilitate actual usage; and cost is increased with an increase in the scale of 3D-MEMS due to one coupler and one PD arranged in each path.

SUMMARY

A technical problem solved by the embodiments of the present application is to provide a 3D-MEMS optical switch. In the 3D-MEMS optical switch, an architecture and volume of the optical switch are simplified since a PD array is integrated inside a core optical switch, window glass partially plated with a reflective film is used, and then an optical path is folded, therefore a design for a spatial optical path is simplified, which is beneficial to realize a large-scale 3D-MEMS optical switch and saves the cost.

In order to address the above technical problems, a 3D-MEMS optical switch is provided according to a first aspect of an embodiment of the present application, which may include:

a collimator array, a PD array, window glass covering the PD array and partially plated with a reflective film, an MEMS micromirror and a core optical switch controller connected to the PD array and the MEMS micromirror, where the window glass covering on the PD array and partially plated with the reflective film is configured to acquire an optical signal from the collimator array, partially reflect the optical signal acquired from the collimator array onto the MEMS micromirror and partially transmit the optical signal acquired from the collimator array onto the PD array; and further to acquire an optical signal reflected by the MEMS micromirror, partially reflect the optical signal reflected by the MEMS micromirror onto the collimator array and partially transmit the optical signal reflected by the MEMS micromirror onto the PD array;

the PD array is configured to detect an optical power of the optical signal transmitted onto the PD array; and the core optical switch controller is configured to adjust the MEMS micromirror based on the detected optical power of the optical signal transmitted onto the PD array, to make insertion loss of the 3D-MEMS optical switch meet a preset target attenuation value.

In a first possible implementation of the first aspect, the PD array is fixed on the collimator array, or is fixed on an input/output optical path of the collimator array via a support.

In a second possible implementation of the first aspect, the PD array includes an input PD array and an output PD array;

the window glass covering the PD array and partially plated with the reflective film includes input window glass and output window glass;

the collimator array includes an input collimator array and an output collimator array;

the MEMS micromirror includes an input MEMS micromirror and an output MEMS micromirror;

where the input window glass is configured to acquire an optical signal from the input collimator array, partially reflect the optical signal acquired from the input collimator array onto the input MEMS micromirror and partially transmit the optical signal acquired from the input collimator array onto the input PD array;

the input MEMS micromirror is configured to reflect the optical signal onto the output MEMS micromirror;

the output MEMS micromirror is configured to reflect the optical signal onto the output window glass; and the output window glass is configured to acquire the optical signal reflected by the output MEMS micromirror, partially reflect the optical signal reflected by the output MEMS micromirror onto the output collimator array and partially transmit the optical signal reflected by the output MEMS micromirror onto the output PD array.

In conjunction with the second possible implementation of the first aspect, in a third possible implementation of the first aspect, a plane on which the input PD array is located is parallel to a plane on which the output PD array is located; a plane on which the input collimator array is located is parallel to a plane on which the output collimator array is located; and a plane on which the input MEMS micromirror is located is parallel to a plane on which the output MEMS micromirror is located.

In conjunction with the second possible implementation of the first aspect, in a fourth possible implementation of the first aspect, the input PD array is arranged in the same plane with the output PD array; the input collimator array is arranged in the same plane with the output collimator array; and the input MEMS micromirror is arranged in the same plane with the output MEMS micromirror.

In conjunction with a fourth possible implementation of the first aspect, in a fifth possible implementation of the first aspect, the 3D-MEMS optical switch further includes a reflecting mirror or a triangular prism disposed on an optical path between the input MEMS micromirror and the output MEMS micromirror and configured to reflect an optical signal reflected by the input MEMS micromirror onto the output MEMS micromirror.

In a sixth possible implementation of the first aspect, the window glass covering the PD array and partially plated with the reflective film being configured to partially reflect the optical signal acquired from the collimator array onto the MEMS micromirror and partially transmit the optical signal acquired from the collimator array onto the PD array includes:

reflecting, in a first preset ratio, the optical signal acquired from the collimator array to the MEMS micromirror; and transmitting, in a second preset ratio, the optical signal acquired from the collimator array onto the PD array; and the window glass covering the PD array and partially plated with the reflective film being configured to partially reflect the optical signal reflected by the MEMS micromirror onto the collimator array and partially transmit the optical signal reflected by the MEMS micromirror onto the PD array includes:

reflecting, in the first preset ratio, the optical signal reflected by the MEMS micromirror onto the collimator array; and transmitting, in the second preset ratio, the optical signal reflected by the MEMS micromirror onto the PD array.

In conjunction with the second possible implementation of the first aspect, in a seventh possible implementation of the first aspect, the input PD array is configured to detect an input optical power of the optical signal transmitted onto the input PD array;

the output PD array is configured to detect an output optical power of the optical signal transmitted onto the output PD array; and the core optical switch controller is configured to adjust an angle of the MEMS micromirror in a case that insertion loss of the 3D-MEMS optical switch does not meet a preset attenuation interval, to make the insertion loss of the 3D-MEMS optical switch meet a preset target attenuation value.

In an eighth possible implementation of the first aspect, the PD array includes multiple PD sub-arrays.

In conjunction with the fourth possible implementation of the first aspect, in a ninth possible implementation of the first aspect, the input PD array and the output PD array are connected as a whole, and the input window glass and the output window glass are connected as a whole.

In conjunction with the fourth possible implementation of the first aspect, in a tenth possible implementation of the first aspect, the input MEMS micromirror and the output MEMS micromirror are connected as a whole.

In conjunction with the fourth possible implementation of the first aspect, in a eleventh possible implementation of the first aspect, the input collimator array and the output collimator array are connected as a whole.

In the embodiments of the present application, the PD array is integrated inside the core optical switch, so as to simplify the architecture of the optical switch and reduce the volume thereof. The window glass covering the PD array and partially plated with the reflective film is used to fold the optical path, therefore the optical signal is transmitted partially to the PD array, hence the core optical switch controller adjusts the MEMS micromirror based on the optical power of the optical signal detected by the PD array, so that the insertion loss of the 3D-MEMS optical switch meets the preset attenuation interval. In the present application, the design for the spatial optical path is simplified, thereby realizing the large-scale 3D-MEMS optical switch and saving the cost.

BRIEF DESCRIPTION OF THE DRAWINGS

The drawings to be used in the description of the embodiments or the conventional technology will be described briefly as follows, so that the technical solutions according to the embodiments of the present application or according to the conventional technology will become clearer. It is apparent that the drawings in the following description only illustrate some embodiments of the present application. For those skilled in the art, other drawings may be obtained according to these drawings without any creative work.

DETAILED DESCRIPTION OF EMBODIMENTS

The technical solution according to the embodiments of the present application will be described clearly and completely below in conjunction with the drawings in the embodiments of the present application. It is apparent that the described embodiments are only a few rather than all embodiments according to the present application. Any other embodiments obtained by those skilled in the art based on the embodiments in the present application without any creative work will fall within the scope of the present application.

A 3D-MEMS optical switch is provided according to an embodiment of the present application, which includes: a collimator array, a PD array, window glass covering on the PD array and partially plated with a reflective film, an MEMS micromirror and a core optical switch controller connected to the PD array and the MEMS micromirror. The PD array is integrated inside the core optical switch, so as to simplify the architecture of the optical switch and reduce the volume thereof. The window glass partially plated with the reflective film is used to fold an optical path, therefore the optical signal is partially transmitted onto the PD array, thereby simplifying a design for a spatial optical path, realizing a large-scale 3D-MEMS optical switch and saving the cost. In the following, descriptions are made with specific embodiments.

Figure 2:
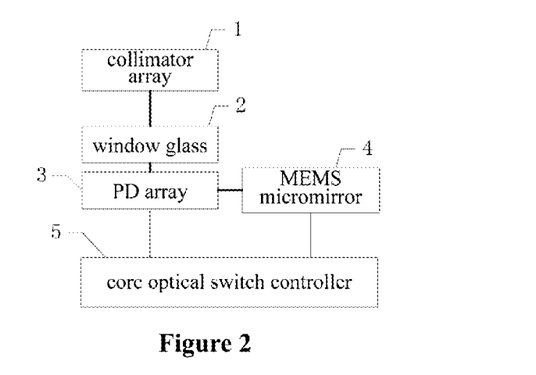
FIG. 2 is a schematic structural diagram of a 3D-MEMS optical switch according to an embodiment of the present application.

FIG. 2 is a schematic structural diagram of a 3D-MEMS optical switch according to an embodiment of the present application. As shown in FIG. 2, the 3D-MEMS optical switch according to the embodiment of the present application may include:

a collimator array 1, a PD array 3, window glass 2 covering on the PD array and partially plated with a reflective film, an MEMS micromirror 4 and a core optical switch controller 5 connected to the PD array 3 and the MEMS micromirror 4. The core optical controller 5 is communicatively connected to the PD array 3 and the MEMS micromirror 4.

The window glass 2 covering on the PD array and partially plated with the reflective film is configured to acquire an optical signal from the collimator array 1, partially reflect the optical signal acquired from the collimator array 1 onto the MEMS micromirror 4 and partially transmit the optical signal acquired from the collimator array 1 onto the PD array 3, and further acquire an optical signal reflected by the MEMS micromirror 4, partially reflect the optical signal reflected by the MEMS micromirror 4 onto the collimator array 1 and partially transmit the optical signal reflected by the MEMS micromirror 4 onto the PD array 3.

The PD array 3 is configured to detect an optical power of the optical signal transmitted onto the PD array.

The core optical switch controller 5 is configured to adjust the MEMS micromirror 4 based on the detected optical power of the optical signal transmitted onto the PD array 3, so that insertion loss of the 3D-MEMS optical switch meets a preset target attenuation value.

Optionally, the PD array 3 may be fixed on the collimator array 1, or fixed on an input/output optical path of the collimator array 1 via a support. A difficulty in a process for packeting 3D-MEMS optical switch may be reduced by fixing the PD array on the collimator array.

Optionally, the PD array 3 includes an input PD array and an output PD array.

The window glass 2 covering on the PD array 3 and partially plated with the reflective film includes input window glass and output window glass.

The collimator array 1 includes an input collimator array and an output collimator array.

The MEMS micromirror 4 includes an input MEMS micromirror and an output MEMS micromirror.

The input window glass is configured to acquire the optical signal from the input collimator array, partially reflect the optical signal acquired from the input collimator array onto the input MEMS micromirror and partially transmit the optical signal acquired from the input collimator array onto the input PD array.

The input MEMS micromirror is configured to reflect the optical signal onto the output MEMS micromirror.

The output MEMS micromirror is configured to reflect the optical signal onto the output window glass.

The output window glass is configured to acquire the optical signal reflected by the output MEMS micromirror, partially reflect the optical signal reflected by the output MEMS micromirror onto the output collimator array and partially transmit the optical signal reflected by the output MEMS micromirror onto the output PD array.

In the 3D-MEMS optical switch according to the embodiment of the present application, the PD array is integrated inside the core optical switch, so as to simplify the architecture of the optical switch and reduce the volume thereof. The PD array is used to replace a separated PD, which extremely saves the space and cost. Instead of the 1×2 coupler, the window glass partially plated with the reflective film is used, so as to save the cost. Moreover, the optical signal transmitted by the window glass partially plated with the reflective film can be used for power detection, and the optical signal reflected by the window glass partially plated with the reflective film can be used for intersection dispatching. In addition, the window glass partially plated with the reflective film may fold the optical path, and therefore the design for a spatial optical path is simplified, thereby realizing a large-scale 3D-MEMS optical switch and saving the cost.

Figure 3:
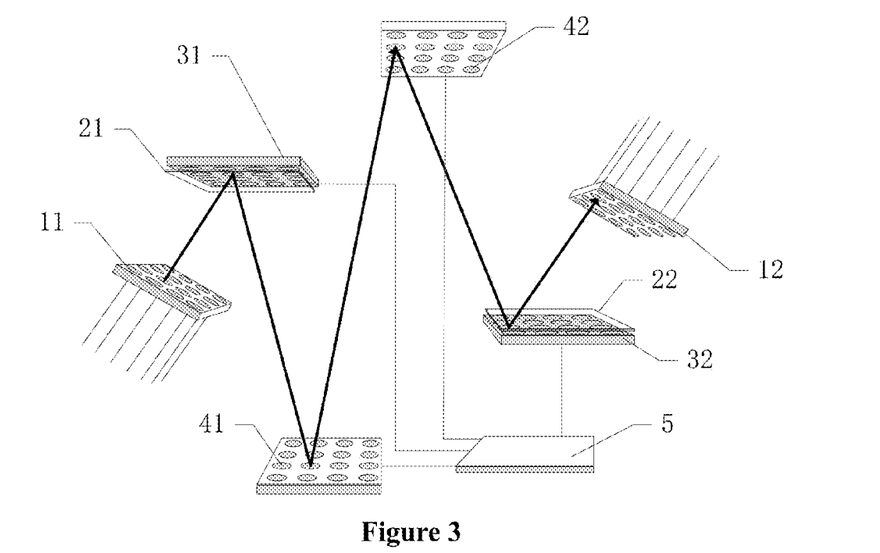
FIG. 3 is a specific schematic structural diagram of a 3D-MEMS optical switch according to a first embodiment of the present application.

FIG. 3 is a schematic structural diagram of a 3D-MEMS optical switch according to a first embodiment of the present application. As shown in FIG. 3, the 3D-MEMS optical switch according to the embodiment of the present application may include:

an input collimator array 11, input window glass 21, an input PD array 31, an input MEMS micromirror 41, an output MEMS micromirror 42, output window glass 22, an output PD array 32, an output collimator array 12 and a core optical switch controller 5.

The core optical switch controller 5 is communicatively connected to the input PD array 31, the input MEMS micromirror 41, the output MEMS micromirror 42 and the output PD array 32.

The input collimator array 11 is configured to receive an optical signal inputted from an optical fiber. The input collimator array 11 is an incident port for a peripheral optical signal. All optical signals enter the input collimator array 11 through an input optical fiber. Then, the input collimator array 11 performs beam shaping on the inputted optical signals, to make beam waists of the optical signals larger and divergence angles of the optical signals narrower, so that these input optical signals can be transferred farther in free space.

The input window glass 21 is configured to acquire the optical signal from the input collimator array 11, partially reflect the optical signal acquired from the input collimator array 11 onto the input MEMS micromirror 41 and partially transmit the optical signal acquired from the input collimator array 11 onto the input PD array 31.

Optionally, the input window glass 21 covers on the input PD array 31 and is partially plated with a reflective film. When passing through the input window glass 21, the optical signal acquired from the input collimator array 11 is reflected onto the input MEMS micromirror 41 in a preset first ratio, and is transmitted onto the input PD array 31 in a preset second ratio. The preset first ratio is, for example, 95%; the preset second ratio is, for example, 5%; and the sum of the first and second preset radios is 100%. Specifically, most of the optical signal may be reflected onto the input MEMS micromirror 41 and a small portion of optical signal may be transmitted onto the input PD array 31. That is, the preset first ratio may be greater than the preset second ratio. In an implementation, the window glass may be plated with a film in a preset coupling ratio to control a ratio of reflected light and transmitted light. For example, a surface of the input window glass may be plated with a reflective film in the preset coupling ratio. Then, 95% of the optical signal may be reflected onto the input MEMS micromirror 41 and 5% of the optical signal may be transmitted onto the input PD array 31.

The input PD array 31 is configured to detect an input optical power of the optical signal transmitted onto the input PD array 31. The input PD array 31 performs a photoelectric conversion on the transmitted optical signal, detects optical power, and obtains an input optical power, and sends the detected input optical power to the core optical switch controller 5.

The input MEMS micromirror 41 is configured to reflect the optical signal reflected by the input window glass 21 onto the output MEMS micromirror 42. The input MEMS micromirror includes multiple sub-micromirrors, and further includes an MEMS micromirror chip which is configured to receive a micromirror control signal sent from the core optical switch controller 5 and then rotate the MEMS micromirror. The input MEMS micromirror 41 has an adjustable rotation angle, to reflect the optical signal into different directions to dispatch the optical switch.

The output MEMS micromirror 42 is configured to reflect the optical signal reflected by the input MEMS micromirror 41 onto the output window glass 22. The output MEMS micromirror includes multiple sub-micromirrors, and further includes an MEMS micromirror chip which is configured to receive a micromirror control signal sent from the core optical switch controller 5 and then rotate the MEMS micromirror. The output MEMS micromirror 42 has an adjustable rotation angle, to reflect the optical signal into different directions to dispatch the optical switch.

The output window glass 22 is configured to acquire the optical signal reflected by the output MEMS micromirror 42, partially reflect the optical signal reflected by the output MEMS micromirror 42 onto the output collimator array 12 and partially transmit the optical signal reflected by the output MEMS micromirror 42 onto the output PD array 32.

Optionally, the output window glass 22 covers on the output PD array 32 and is partially plated with the reflective film. When passing through the output window glass 22, an optical signal reflected by the output MEMS micromirror 42 is reflected onto the output collimator array 12 in a preset first ratio and is transmitted onto the output PD array 32 in a preset second ratio. The preset first ratio is, for example, 95%; the preset second ratio is, for example, 5%; and the sum of the preset first ratio and the second preset ratio is 100%. Specifically, most of the optical signal may be reflected onto the output collimator array 12 and a small portion of the optical signal may be transmitted onto the output PD array 32. That is, the preset first ratio may be larger than the preset second ratio. In an implementation, the window glass may be plated with a film in a preset coupling ratio to control a ratio of reflected light and transmitted light. For example, a surface of the output window glass may be plated with a reflective film in the preset coupling ratio. Then, 95% of the optical signal may be reflected onto the output collimator array 12 and 5% of the optical signal may be transmitted onto the output PD array 32.

The output PD array 32 is configured to detect an output optical power of the optical signal transmitted onto the output PD array 32. The input PD array 32 performs a photoelectric conversion on the transmitted optical signal, detects optical power, and obtains the output optical power, and sends the detected output optical power to the core optical switch controller 5.

The output collimator array 12 is configured to receive the optical signal reflected by the output array 32, couple the received optical signal into an optical fiber to output the coupled optical signal.

The core optical switch controller 5 is configured to receive the input optical power from the input PD array 31 and the output optical power from the output PD array 32, and calculate insertion loss of the 3D-MEMS optical switch. Specifically, the insertion loss of the 3D-MEMS optical switch is a ratio of the output optical power to the input optical power.

Optionally, the core optical switch controller 5 is further configured to adjust an angle of the MEMS micromirror based on the calculated insertion loss of the 3D-MEMS optical switch, to minimize the insertion loss of the 3D-MEMS optical switch, that is, to adjust the insertion loss of the 3D-MEMS optical switch into an optimal state.

Optionally, the core optical switch controller 5 is further configured to receive a micromirror adjustment control command sent by a user or other devices; adjust the angle of the MEMS micromirror based on the received micromirror adjustment control command. Specifically, the core optical switch controller 5 sends a micromirror control signal to the MEMS micromirror, and then the MEMS micromirror chip rotates the MEMS micromirror after receiving the micromirror control signal from the core optical switch controller 5. A coupling angle between the optical signal and the output collimator array is controlled to form coupling adaptation, and an attenuation power value of the output optical signal is further controlled to balance optical power of multiple paths. Furthermore, the core optical switch controller 5 receives an input optical power from the input PD array 31 and an output optical power from the output PD array 32 in a real-time manner, and adjust the angle of the MEMS micromirror based on the calculated insertion loss, thereby improving an attenuation precision.

Optionally, the core optical switch controller 5 is further configured to, in the case that the insertion loss of the 3D-MEMS optical switch does not meet a preset target attenuation value, adjust the angle of the MEMS micromirror, to make the insertion loss of the 3D-MEMS optical switch meet the preset target attenuation value. A preset attenuation interval is an interval value obtained, by setting a fluctuation value and adding and subtracting the fluctuation value from the preset target attenuation value. For example, the preset target attenuation value is 3 dB and an interval of ±0.2 dB is set, then the preset attenuation interval is from 2.8 dB to 3.2 dB. The core optical switch controller 5 receives the input optical power from the input PD array 31 and the output optical power from the output PD array 32 in a real-time manner, calculates the insertion loss based on the received input optical power and output optical power, determines whether the calculated insertion loss is within the preset attenuation interval, adjusts an angle of the input MEMS micromirror 41 and an angle of the output MEMS micromirror 42 in a case that the calculated insertion loss is not within the preset attenuation interval, and then receive the input optical power and the output optical power in a real-time manner again, calculates an insertion loss, determines whether the calculated insertion loss is within the preset attenuation interval, and continues to adjust the angle of the input MEMS micromirror 41 and the angle of the output MEMS micromirror 42 in a case that the calculated insertion loss is not within the preset attenuation interval. The above loop repeats until the insertion loss meets the preset target attenuation value.

Specifically, in a case that the core optical switch controller 5 adjusts the rotation angle of the MEMS micromirror, the MEMS micromirror is to be continued deflecting in this direction if the insertion loss is close to the preset target attenuation value; the MEMS micromirror is deflected in an opposite direction if the insertion value is far away from the preset target attenuation value; and it is considered that the MEMS micromirror is adjusted to an optimal location if the insertion loss is far away from the preset target attenuation value regardless of the deflection direction of the MEMS micromirror, and the adjustment is terminated. If the time for adjusting the micromirror reaches a preset termination time, the adjustment is terminated. For example, if the MEMS micromirror still does not reach the optimal location after being adjusted for 60 seconds, then it will break out of the loop and the adjustment is terminated, until a next adjustment is triggered to be started.

Further optionally, the input PD array 31 may be fixed on the input collimator array 11, and the output PD array may be fixed on the output collimator array 12, thereby reducing the difficulty in a process for packaging the 3D-MEMS optical switch.

Further optionally, a plane on which the input PD array 31 is located may be parallel to a plane on which the output PD array 32 is located, a plane on which the input collimator array 11 is located may be parallel to a plane on which the output collimator array 12 is located, and a plane on which the input MEMS micromirror 41 is located may be parallel to a plane on which the output MEMS micromirror 42 is located, thereby reducing the difficulty in a process for packaging the 3D-MEMS optical switch and simplifying the architecture and volume of optical switch.

Further optionally, the input PD array 31 may include multiple PD sub-arrays, the output PD array 32 may include multiple PD sub-arrays. By using the multiple PD sub-arrays, a yield rate of the PD array may be improved, and a bad point is easy to be found.

The 3D-MEMS optical switch according to the embodiment of the present application may include: the input collimator array 11, the input window glass 21, the input PD array 31, the input MEMS micromirror 41, the output MEMS micromirror 42, the output window glass 22, the output PD array 32, the output collimator array 12 and the core optical switch controller 5. The PD array is integrated inside the core optical switch, so as to simplify the architecture of the optical switch and reduce the volume thereof. The optical signal transmitted by the window glass partially plated with the reflective film is used for optical path detection, the optical signal reflected by the window glass partially plated with the reflective film is used for intersection dispatching, and the optical path is folded. Therefore, the design for the spatial optical path is simplified, thereby realizing a large-scale 3D-MEMS optical switch and saving the cost.

Figure 4:
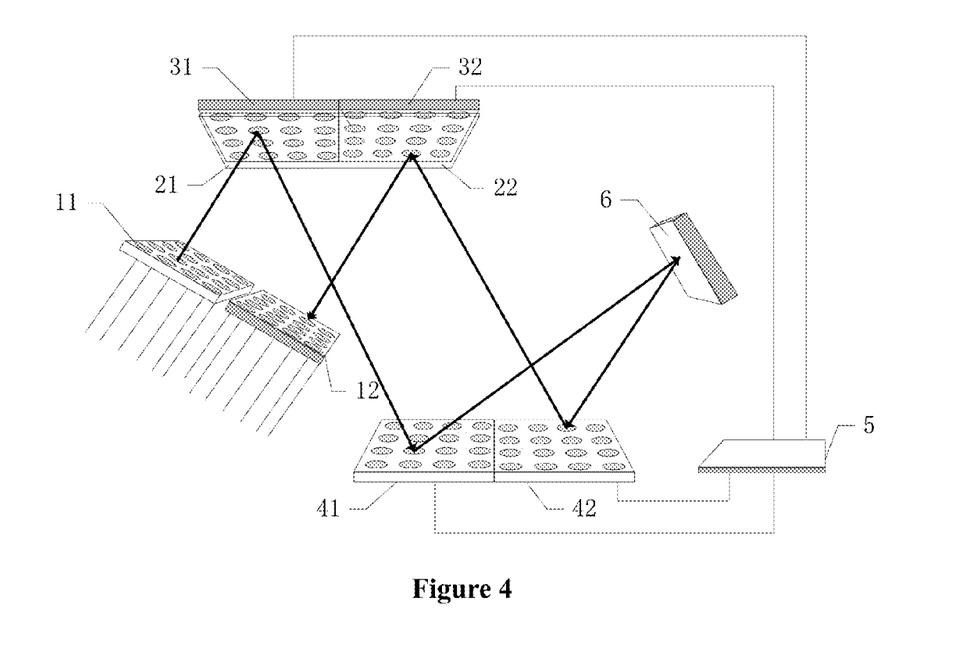
FIG. 4 is a specific schematic structural diagram of a 3D-MEMS optical switch according to a second embodiment of the present application.

FIG. 4 is a schematic structural diagram of a 3D-MEMS optical switch according to a second embodiment of the present application. As shown in the FIG. 4, the 3D-MEMS optical switch according to the embodiment of the present application may include:

an input collimator array 11, input window glass 21, an input PD array 31, an input MEMS micromirror 41, an output MEMS micromirror 42, output window glass 22, an output PD array 32, an output collimator array 12, a core optical switch controller 5 and a reflecting mirror 6.

The core optical switch controller 5 is communicatively connected to the input PD array 31, the input MEMS micromirror 41, the output MEMS micromirror 42 and the output PD array 32.

The input PD array 31 is arranged in the same plane with the output PD array 32, the input collimator array 11 is arranged in the same plane with the output collimator array 12, and the input MEMS micromirror 41 is arranged in the same plane with the output MEMS micromirror 42.

The input collimator array 11 is configured to receive an optical signal inputted by an optical fiber.

The input window glass 21 is configured to acquire the optical signal from the input collimator array 11, partially reflect the optical signal acquired from the input collimator array 11 onto the input MEMS micromirror 41, and partially transmit the optical signal onto the input PD array 31. The input window glass 21 covers on the input PD array 31 and is partially plated with a reflective film, which has been described in detail in the first embodiment of the present application shown as FIG. 3 and will not be described herein anymore.

The input PD array 31 is configured to detect an input optical power of the optical signal transmitted onto the input PD array 31, and send the detected input optical power to the core optical switch controller 5.

The input MEMS micromirror 41 is configured to reflect the optical signal reflected by the input window glass 21 onto the reflecting mirror 6. The input MEMS micromirror includes multiple sub-micromirrors, and further includes an MEMS micromirror chip which is configured to receive a micromirror control signal sent from the core optical switch controller 5 and then rotate the MEMS micromirror.

The reflecting mirror 6 is disposed on an optical path between the input MEMS micromirror and the output MEMS micromirror and is configured to reflect the optical signal reflected by the input MEMS micromirror 41 onto the output MEMS micromirror 42.

The output MEMS micromirror 42 is configured to reflect the optical signal reflected by the reflecting mirror 6 onto the output window glass 22. The output MEMS micromirror includes multiple sub-micromirrors and further includes an MEMS micromirror chip which is configured to receive a micromirror control signal sent from the core optical switch controller 5 and then rotate the MEMS micromirror.

The output window glass 22 is configured to acquire the optical signal reflected by the output MEMS micromirror 42, partially reflect the optical signal reflected by the output MEMS micromirror 42 onto the output collimator array 12 and partially transmit the optical signal reflected by the output MEMS micromirror 42 onto the output PD array 32. The output window glass 22 covers on the output PD array 32 and is partially plated with a reflective film, which has been described in detail in the first embodiment of the present application as shown in FIG. 3 and will not be described herein anymore.

The output PD array 32 is configured to detect an output optical power of the optical signal transmitted onto the output PD array 32 and send the detected output optical power to the core optical switch controller 5.

The output collimator array 12 is configured to receive the optical signal reflected by the output PD array 32 and couple the received optical signal into an optical fiber to output the received optical signal.

The core optical switch controller 5 is configured to receive the input optical power from the input PD array 31 and the output optical power from the output PD array 32; calculate insertion loss of the 3D-MEMS optical switch; and in a case that the insertion loss of the 3D-MEMS optical switch does not meet a preset attenuation interval, adjust an angle of the MEMS micromirror, so as to make the insertion loss of the 3D-MEMS optical switch meet a preset target attenuation value. The process for adjusting the MEMS micromirror by the core optical switch controller 5 has been described in detail in the first embodiment of the present application shown as in FIG. 3 and will not be described herein anymore.

Further optionally, the input PD array 31 and the output PD array 32 may be connected as a whole, and the input window glass 21 and the output window glass 22 may be connected as a whole. In an implementation, the input PD array 31 and the output PD array 32 may be two separated PD arrays which are spliced as a whole to facilitate packaging. Alternatively, a whole PD array may be designed, which is further divided into two sub-regions. One of the sub-regions is an input region corresponding to the input PD array and the other of the sub-regions is an output region corresponding to the output PD array. Further, the PD array may include multiple PD sub-arrays. By using the multiple PD sub-arrays, the yield rate of the PD array may be improved, and a bad point is easy to be found. The window glass may be two window glasses which are spliced together, or may be a whole window glass which is divided into two sub-regions. One of the sub-regions is an input region corresponding to the input window glass and the other of the sub-regions is an output region corresponding to the output window glass.

Further optionally, the input MEMS micromirror 41 and the output MEMS micromirror 42 may be connected as a whole. The MEMS micromirror may be disposed on the MEMS chip. The input MEMS micromirror 41 and the output MEMS micromirror 42 may be two separated MEMS micromirrors which are spliced as a whole. The MEMS chips may also be designed to be integrated together, that is, the whole MEMS chip is packaged together and then divided into two sub-regions. One of the sub-regions is an input region corresponding to the input MEMS micromirror, the other of the sub-regions is an output region corresponding to the output MEMS micromirror, and the input region and the output region each have multiple MEMS micromirrors.

Further optionally, the input collimator array 11 and the output collimator array 12 may be connected as a whole. The input collimator array 11 and the output collimator array 12 may be two separated collimator arrays which are spliced as a whole. Alternatively, collimator arrays may be designed to be integrated together, that is, the whole collimator array is packaged, and then divided into two sub-regions. One of the sub-regions is an input region corresponding to the input collimator array and the other of the sub-regions is an output region corresponding to the output collimator array.

The 3D-MEMS optical switch according to the embodiment of the present application may include: the input collimator array 11, the input window glass 21, the input PD array 31, the input MEMS micromirror 41, the output MEMS micromirror 42, the output window glass 22, the output PD array 32, the output collimator array 12, the core optical switch controller 5 and the reflecting mirror 6. The PD array is integrated inside the core optical switch, so as to simplify the architecture of the optical switch and reduce the volume thereof. The optical signal transmitted by the window glass partially plated with the reflective film is used for optical path detection, and the optical signal reflected by the window glass partially plated with the reflective film is used for intersection dispatching, the optical path is folded by the reflecting mirror 6, such that the input PD array 31 is in the same plane with the output PD array 32, the input collimator array 11 is in the same plane with the output collimator array 12, and the input MEMS micromirror 41 is in the same plane with the output MEMS micromirror 42. In addition, the input PD array 31 and the output PD array 32 may be connected as a whole, or the input collimator array 11 and the output collimator array 12 may be connected as a whole, or the input MEMS micromirror 41 and the output MEMS micromirror 42 may be connected as a whole. In this way, the difficulty for realizing the optical switch is reduced and the design for a spatial optical path is simplified, thereby realizing a large-scale 3D-MEMS optical switch and saving the cost.

Figure 5:
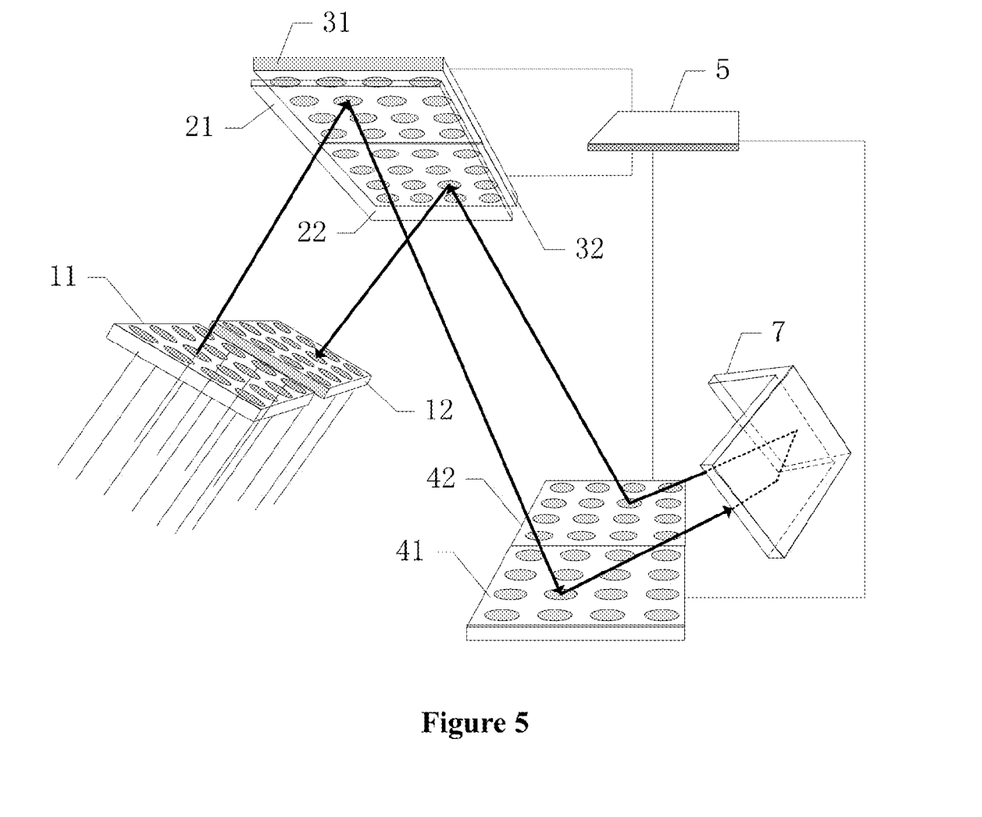
FIG. 5 is a specific schematic structural diagram of a 3D-MEMS optical switch according to a third embodiment of the present application.

FIG. 5 is a schematic structural diagram of a 3D-MEMS optical switch according a third embodiment of the present application. As shown in FIG. 5, the 3D-MEMS optical switch according to the embodiment of the present application may include:

an input collimator array 11, input window glass 21, an input PD array 31, an input MEMS micromirror 41, an output MEMS micromirror 42, output window glass 22, an output PD array 32, an output collimator array 12, a core optical switch controller 5 and a triangular prism 7.

The core optical switch controller 5 is communicatively connected to the input PD array 31, the input MEMS micromirror 41, the output MEMS micromirror 42 and the output PD array 32.

The input PD array 31 is arranged in the same plane with the output PD array 32, the input collimator array 11 is arranged in the same plane with the output collimator array 12 and the input MEMS micromirror 41 is arranged in the same plane with the output MEMS micromirror 42.

The input collimator array 11 is configured to receive an optical signal inputted by an optical fiber.

The input window glass 21 is configured to acquire the optical signal from the input collimator array 11, partially reflect the optical signal acquired from the input collimator array 11 onto the input MEMS micromirror 41 and partially transmit the optical signal onto the input PD array 31. The input window glass 21 covers on the input PD array 31 and is partially plated with a reflective film, which has been described in detail in the first embodiment of the present application as shown in FIG. 3 and will not be described herein anymore.

The input PD array 31 is configured to detect an input optical power of the optical signal transmitted onto the input PD array 31 and send the detected input optical power to the core optical switch controller 5.

The input MEMS micromirror 41 is configured to reflect the optical signal reflected by the input window glass 21 onto the triangular prism 7.

The triangular prism 7 is disposed on an optical path between the input MEMS micromirror and the output MEMS micromirror, to reflect the optical signal reflected by the input MEMS micromirror 41 onto the output MEMS micromirror 42.

The output MEMS micromirror 42 is configured to reflect the optical signal reflected by the triangular prism 7 onto the output window glass 22.

The output window glass 22 is configured to acquire the optical signal reflected by the output MEMS micromirror 42, partially reflect the optical signal reflected by the output MEMS micromirror 42 onto the output collimator array 12 and partially transmit the optical signal reflected by the output MEMS micromirror 42 onto the output PD array 32. The output window glass 22 covers on the output PD array 32 and is partially plated with a reflective film, which has been described in detail in the first embodiment of the present application as shown in FIG. 3 described above and will not be described herein anymore.

The output PD array 32 is configured to detect an output optical power of the optical signal transmitted onto the output PD array 32 and send the detected output optical power to the core optical switch controller 5.

The output collimator array 12 is configured to receive the optical signal reflected by the output PD array 32 and couple the received optical signal into an optical fiber to output the received optical signal.

The core optical switch controller 5 is configured to receive the input optical power from the input PD array 31 and the output optical power from the output PD array 32; calculate insertion loss of the 3D-MEMS optical switch; and in a case that the insertion loss of the 3D-MEMS optical switch dose not meet a preset attenuation interval, adjust an angle of the MEMS micromirror, so as to make the insertion loss of the 3D-MEMS optical switch meet a preset target attenuation value. The process for adjusting the MEMS micromirror by the core optical switch controller 5 has been described in detail in the first embodiment of the present application as shown in FIG. 3 and will not be described herein anymore.

Further optionally, the input PD array 31 and the output PD array 32 may be connected as a whole, and the input window glass 21 and the output window glass 22 may be connected as a whole. In an implementation, the input PD array 31 and the output PD array 32 may be two separated PD arrays which are spliced together to facilitate packaging. Alternatively, a whole PD array may be designed, which is further divided into two sub-regions. One of the sub-regions is an input region corresponding to the input PD array and the other of the sub-regions is an output region corresponding to the output PD array. Further optionally, the PD array may include multiple PD sub-arrays. By using the multiple sub PD arrays, the yield rate of the PD array may be improved, and a bad point is easy to be found. The window glass may be two window glasses which are spliced together, or may be a whole window glass which is divided into two sub-regions. One of the sub-regions is an input region corresponding to the input window glass and the other of the sub-regions is an output region corresponding to the output window glass.

Further optionally, the input MEMS micromirror 41 and the output MEMS micromirror 42 may be connected as a whole. The MEMS micromirror may be disposed on the MEMS chip. The input MEMS micromirror 41 and the output MEMS micromirror 42 may be two separated MEMS micromirrors which are spliced as a whole. The MEMS chips may also be designed to be integrated together, that is, the whole MEMS chip is packaged together and then divided into two sub-regions. One of the sub-regions is an input region corresponding to the input MEMS micromirror, the other of the sub-regions is an output region corresponding to the output MEMS micromirror, and the input region and the output region each have multiple MEMS micromirrors.

Further optionally, the input collimator array 11 and the output collimator array 12 may be connected as a whole. The input collimator array 11 and the output collimator array 12 may be two separated collimator arrays which are spliced as a whole. Alternatively, collimator arrays may be designed to be integrated together, that is, the whole collimator array is packaged, and then divided into two sub-regions. One of the sub-regions is an input region corresponding to the input collimator array and the other of the sub-regions is an output region corresponding to the output collimator array.

The 3D-MEMS optical switch according to the embodiment of the present application may include: the input collimator array 11, the input window glass 21, the input PD array 31, the input MEMS micromirror 41, the output MEMS micromirror 42, the output window glass 22, the output PD array 32, the output collimator array 12, the core optical switch controller 5 and the triangular prism 7. The PD array is integrated inside the core optical switch, so as to simplify the architecture of the optical switch and reduce the volume thereof. The optical signal transmitted by the window glass partially plated with the reflective film is used for optical path detection, and the optical signal reflected by the window glass partially plated with the reflective film is used for intersection dispatching, the optical path is folded by the triangular prism 7, such that the input PD array 31 is in the same plane with the output PD array 32, the input collimator array 11 is in the same plane with the output collimator array 12, and the input MEMS micromirror 41 is in the same plane with the output MEMS micromirror 42. In addition, the input PD array 31 and the output PD array 32 may be connected as a whole, or the input collimator array 11 and the output collimator array 12 may be connected as a whole, or the input MEMS micromirror 41 and the output MEMS micromirror 42 may be connected as a whole. In this way, the difficulty for realizing the optical switch is reduced, and the design for a spatial optical path is simplified, thereby realizing a large-scale 3D-MEMS optical switch and saving the cost.

It may be clearly understood by those skilled in the art with the above descriptions of the embodiments that, the present application may be realized with hardware, firmware or a combination thereof. The foregoing are only preferred embodiments of the present application and therefore are not intended to limit the scope of claims of the present application. Therefore, equivalent changes made according to the claims of the present application will still fall within the scope of the present application.

What is claimed is:

1. A 3-dimensions micro-electro-mechanic system 3D-MEMS optical switch, comprising: a collimator array, a power detector (PD) array, window glass covering the PD array and partially plated with a reflective film, a micro-electro-mechanic system MEMS micromirror, and a core optical switch controller connected to the PD array and the MEMS micromirror; wherein the window glass covering the PD array and partially plated with the reflective film is configured to acquire an optical signal from the collimator array, partially reflect the optical signal acquired from the collimator array onto the MEMS micromirror and partially transmit the optical signal acquired from the collimator array onto the PD array, and is further configured to acquire an optical signal reflected by the MEMS micromirror, partially reflect the optical signal reflected by the MEMS micromirror onto the collimator array and partially transmit the optical signal reflected by the MEMS micromirror onto the PD array;

the PD array is configured to detect an optical power of the optical signal transmitted onto the PD array; and the core optical switch controller is configured to adjust the MEMS micromirror based on the detected optical power of the optical signal transmitted onto the PD array, to make insertion loss of the 3D-MEMS optical switch meet a preset target attenuation value.

2. The 3D-MEMS optical switch according to claim 1, wherein the PD array is fixed on the collimator array, or is fixed on an input/output optical path of the collimator array via a support.

3. The 3D-MEMS optical switch according to claim 1, wherein the PD array comprises an input PD array and an output PD array;

the window glass covering the PD array and partially plated with the reflective film comprises input window glass and output window glass;

the collimator array comprises an input collimator array and an output collimator array;

the MEMS micromirror comprises an input MEMS micromirror and an output MEMS micromirror;

wherein the input window glass is configured to acquire an optical signal from the input collimator array, partially reflect the optical signal acquired from the input collimator array onto the input MEMS micromirror and partially transmit the optical signal acquired from the input collimator array onto the input PD array;

the input MEMS micromirror is configured to reflect the optical signal onto the output MEMS micromirror;

the output MEMS micromirror is configured to reflect the optical signal onto the output window glass; and the output window glass is configured to acquire the optical signal reflected by the output MEMS micromirror, partially reflect the optical signal reflected by the output MEMS micromirror onto the output collimator array and partially transmit the optical signal reflected by the output MEMS micromirror onto the output PD array.

4. The 3D-MEMS optical switch according to claim 3, wherein a plane on which the input PD array is located is parallel to a plane on which the output PD array is located;

a plane on which the input collimator array is located is parallel to a plane on which the output collimator array is located; and a plane on which the input MEMS micromirror is located is parallel to a plane on which the output MEMS micromirror is located.

5. The 3D-MEMS optical switch according to claim 3, wherein the input PD array is arranged in the same plane with the output PD array;

the input collimator array is arranged in the same plane with the output collimator array; and the input MEMS micromirror is arranged in the same plane with the output MEMS micromirror.

6. The 3D-MEMS optical switch according to claim 5, further comprising a reflecting mirror or a triangular prism disposed on an optical path between the input MEMS micromirror and the output MEMS micromirror and configured to reflect an optical signal reflected by the input MEMS micromirror onto the output MEMS micromirror.

7. The 3D-MEMS optical switch according to claim 1, wherein the window glass covering the PD array and partially plated with the reflective film being configured to partially reflect the optical signal acquired from the collimator array onto the MEMS micromirror and partially transmit the optical signal acquired from the collimator array onto the PD array comprises:

reflecting, in a first preset ratio, the optical signal acquired from the collimator array onto the MEMS micromirror and transmitting, in a second preset ratio, the optical signal acquired from the collimator array onto the PD array; and the window glass covering the PD array and partially plated with the reflective film being configured to partially reflect the optical signal reflected by the MEMS micromirror onto the collimator array and partially transmit the optical signal reflected by the MEMS micromirror onto the PD array comprises:

reflecting, in the first preset ratio, the optical signal reflected by the MEMS micromirror onto the collimator array and transmitting, in the second preset ratio, the optical signal reflected by the MEMS micromirror onto the PD array.

8. The 3D-MEMS optical switch according to claim 3, wherein the input PD array is configured to detect an input optical power of the optical signal transmitted onto the input PD array;

the output PD array is configured to detect an output optical power of the optical signal transmitted onto the output PD array; and the core optical switch controller is configured to adjust an angle of the MEMS micromirror in a case that insertion loss of the 3D-MEMS optical switch does not meet a preset attenuation interval, to make the insertion loss of the 3D-MEMS optical switch meet a preset target attenuation value.

9. The 3D-MEMS optical switch according to claim 1, wherein the PD array comprises a plurality of PD sub-arrays.

10. The 3D-MEMS optical switch according to claim 5, wherein the input PD array and the output PD array are connected as a whole, and the input window glass and the output window glass are connected as a whole.

11. The 3D-MEMS optical switch according to claim 5, wherein the input MEMS micromirror and the output MEMS micromirror are connected as a whole.

12. The 3D-MEMS optical switch according to claim 5, wherein the input collimator array and the output collimator array are connected as a whole.

* * * * *